United States Patent Office 3,288,788
Patented Nov. 29, 1966

3,288,788
2H,6H-CHROMENO(7,6-b)-1,4-OXAZINES AND PROCESSES FOR THEIR PREPARATION
George R. Ramage, Kirkburton, Huddersfield, and John Hill, Salford, England, assignors to Benger Laboratories Limited, Holmes Chapel, Cheshire, England
No Drawing. Filed July 9, 1963, Ser. No. 293,896
Claims priority, application Great Britain, July 10, 1962, 26,406/62
10 Claims. (Cl. 260—244)

The present invention relates to new chemical compounds.

It has been found that the new chromone derivatives as hereinafter defined possess special activity as inhibitors of the antigen-antibody reaction.

Accordingly the present invention is for the new chromone derivatives of the following general formula:

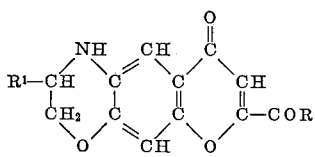

or salts or functional derivatives thereof, where R is hydroxy, or a radical $NHR^2CO_2H$, or the radical $OR^2R^3R^4$ wherein $R^2$ comprises an alkylene radical, straight or branched (for example, methylene, ethylene, ethylidene, isopropylene), and $R^3$ and $R^4$ are the same or different and comprise hydrogen or alkyl groups (for example, methyl or ethyl) or together with the nitrogen form a heterocyclic group (for example, piperidino), and wherein $R^1$ is hydrogen or a lower alkyl group such as methyl or ethyl, or it may be an oxygen atom forming a carbonyl group C=O, with the carbon in the ring.

Examples of compounds according to the present invention which may be mentioned include 3,4-dihydro-3,6-dioxo-2H,6H-chromeno(7,6-b)-1,4-oxazine - 8 - carboxylic acid (the compound of the formula where R is hydroxy and $R^1$ is a carbonyl oxygen atom) and 3,4-dihydro-3-methyl-6-oxo-2H,6H-chromeno(7,6-b)-1,4-oxazine - 3 - carboxylic acid (the compound of the formula where R is hydroxy and $R^1$ is methyl).

Salts of the choromone derivatives which may be mentioned include metal (for example, alkali metal) and ammonium salts of the carboxylic acid function present.

The chromone derivatives of the invention have been shown in experimental anaphylaxis in animals to inhibit the release of spasmogens which normally follow the combination of specific antigen with antibody. In man, the pathological effects which the follow the administration of antigen to susceptible subjects is markedly inhibited. These compounds are therefore also of value in the treatment of any condition in which an extrinsic antigen combination wth antibody is primarily responsble for disease, for example asthma, hay fever, urticaria and the like.

Accordingly one embodiment of the invention is for a pharmaceutical composition which contains a chromone derivative as defined above or a salt or functional derivative thereof and a pharmaceutically acceptable carrier. The pharmaceutically acceptable carrier may be liquid and/or solid. The carrier may be for example suitable for the preparation of tablets or the like or suitable for the preparation of solutions for injection, or suitable for the preparation of creams, lotions, pastes or the like.

The chromone derivatives may also be administered in the form of an aerosol by means of a suitable appliance.

In the case of compounds where $R^1$ is a carbonyl oxygen atom, a convenient starting material is 5-nitroresacetophenone. One embodiment of the invention is the process for the preparation of the chromone derivatives wherein 5-nitroresacetophenone is reduced catalytically under pressure in the presence of Raney nickel to 5-aminoresacetophenone, and chloracetylation of the amino group followed by heating with potassium acetate gives 6 - acetyl-3,4-dihydro-7-hydroxy-3-oxo-2H - 1,4-benzoxazine which is then condensed with diethyl oxalate and the resulting diketone is cyclised by heating in a mixture of glacial acetic and hydrochloric acids to give 3,4 - dihydro-3,6-dioxo-2H,6H-chromeno(7,6-b) - 1,4-oxazine-8-carboxylic acid.

Another embodiment of the invention is the process for the preparation of the chromone derivatives wherein 5-benzoyloxy-2-nitrophenol is reacted with chloroacetone in boiling acetone to give 5-benzoyloxy-2-nitrophenoxyacetone which, on hydrogenation, forms 7-benzoyloxy-3,4-dihydro-3-methyl-2H - 1,4-benzoxazine. Acetylation of this compound under Friedel-Crafts conditions also causes debenzoylation, the product being 6-acetyl-3,4-dihydro-7-hydroxy-3-methyl-2H-1,4-benzoxazine which is condensed with diethyl oxalate to give ethyl-3,4-dihydro-3-methyl-6-oxo-2H,6H-chromeno-(7,6 - b)-1,4-oxazine-8-carboxylate. This ester may be hydrolysed to the corresponding carboxylic acid by heating with glacial acetic acid and sulphuric acid.

The following examples are given to illustrate the present invention; the parts and percentages are by weight unless otherwise indicated.

*Example 1*

A solution of 66 parts of 5-nitroresacetophenone in 880 parts of acetone was treated with hydrogen at room temperature and 20–30 atmospheres, in the presence of Raney nickel. After 1 hour the mixture was filtered and the filtrate evaporated under reduced pressure to 350 parts. 1,000 parts of ether were added and the resulting solution saturated with dry hydrogen chloride from which 59 parts of crude 5-aminoresacetophenone hydrochloride were obtained as a dark brown solid. 3 parts of the crude hydrochloride were dissovled in the minmum amount of water, boiled for 5 minutes with charcoal and filtered. 3 parts of anhydrous potassium acetate were added to the cooled filtrate and 2.2 parts of 5-aminoresacetophenone separated as a pale yellow solid. Crystallisation from a large volume of benzene gave golden yellow prisms of melting point 151° C. (with decomposition).

*Analysis.*—Found: C, 57.8; H, 5.4. Calculated for $C_8H_9NO_3$: C, 57.5; H, 5.4%.

10 parts of 5-aminoresacetophenone and 4.6 parts of chloracetyl chloride were heated under reflux in 450 parts of dry benzene during 12 hours. The cooled mixture was filtered, and gave 13.25 parts of 5-chloroacetyl-aminoresacetophenone as a beige solid, melting point 224–246° C. which crystallised from ethanol as off-white prisms, melting point 251° C.

*Analysis.*—Found: C, 49.3; H, 4.4. $C_{10}H_{10}NO_4Cl$ requires: C. 49.3; H, 4.1%.

12 parts of 5-chloroacetylaminoresacetophenone and 11 parts of anhydrous potassium acetate were heated under reflux, in 250 parts of ethanol, during 1 hour. 100 parts of water were added, and the mixture was cooled for 10 minutes at 0° C. 8.9 parts of 6-acetyl-3,4-dihydro-7-hydroxy-3-oxo-2H-1,4-benzoxazine were filtered off as a light brown solid which crystallised from ethanol as light brown needles, melting point 265° C.

*Analysis.*—Found: C, 57.8; H, 4.2. $C_{10}H_9NO_4$ requires: C, 58.0; H, 4.4%.

A solution of 0.75 part of 6-acetyl-3,4-dihydro-7-hydroxy-3-oxo-2H-1,4-benzoxazine in 20 parts of diethyl oxalate was heated for 30 minutes on a water-bath with a solution of sodium ethoxide (prepared by dissolving 0.45 part of sodium in 10 parts of ethanol). The resulting red suspension was allowed to stand during 30 minutes at room temperature, filtered, and the solid washed with ether and then added to 15 parts of well-stirred 2 N hydrochloric acid. 0.88 part of 6-(3-ethoxycarbonyl-3-oxopropionyl) - 3,4-dihydro-7-hydroxy-3-oxo-2H-1,4-benzoxazine were obtained as a yellow solid, which crystallised from methanol as pale yellow crystals, melting point 215–216° C. (block preheated to 160° C.).

*Analysis.*—Found: C, 54.6; H, 4.0. $C_{14}H_{13}NO_7$ requires: C, 54.7; H, 4.3%.

3.7 parts of 6-(3-ethoxycarbonyl-3-oxopropionyl)-3,4-dihydro-7-hydroxy-3-oxo-2H-1,4-benzoxazine were heated under reflux with 30 parts of glacial acetic acid and 6 parts of concentrated hydrochloric acid during 2 hours. On cooling 2.85 parts of 3,4-dihydro-3,6-dioxo-2H,6H-chromeno(7,6-b)-1,4-oxazine-8-carboxylic acid monohydrate separated as a buff-coloured solid which crystallised from methanol as clusters of small colourless needles, melting point 310° C. (with decomposition).

*Analysis.*—Found: C, 51.6; H, 3.4. $C_{12}H_7NO_6.H_2O$ requires: C, 51.6; H, 3.2%.

Drying for 2 hours at 135° C. and 4 millimetres pressure converted the monohydrate into the anhydrous acid, melting point 305° C. (with decomposition).

*Analysis.*—Found: C, 55.3; H, 3.1; N, 5.3. $C_{12}H_7NO_6$ requires: C, 55.2; H, 2.7; N, 5.4%.

*Example 2*

A well stirred mixture of 41 parts of 5-benzoyloxy-2-nitrophenol, 23 parts of anhydrous potassium carbonate, 5 parts of potassium iodide, 15.4 parts of chloroacetone and 500 parts of dry acetone was heated under reflux during 4 hours. The mixture was filtered and the filtrate evaporated almost to dryness. The solid obtained on slurrying with 20 parts of ethanol was filtered off, washed with 20 parts of ethanol and crystallised from ethanol to yield 28.5 parts of 5-benzoyloxy-2-nitrophenoxyacetone, melting point 123–124° C. Recrystallisation from ethanol gave cream-coloured crystals, melting point 124° C.

*Analysis.*—Found: C, 60.6; H, 4.1. $C_{16}H_{13}NO_6$ requires: C, 61.0; H, 4.2%.

A solution of 23.1 parts of 5-benzoyloxy-2-nitrophenoxyacetone in 800 parts of methanol was shaken with hydrogen at 70 atmospheres in the presence of Raney nickel, until no further drop in pressure was observed. The mixture was filtered and the filtrate evaporated to about 50 parts. On cooling at 0° C., 10.8 parts of 7-benzoyloxy-3,4-dihydro - 3 - methyl-2H-1,4-benzoxazine separated as a grey crystalline solid, melting point 105–107° C. Dry hydrogen chloride was passed through the mother liquors and the mixture was cooled. The solid which separated was stirred into water to give a further amount (0.5 part) of the benzoxazine, melting point 104–106° C. Recrystallisation from ethanol yielded colourless rhombs, melting point 106–107° C.

*Analysis.*—Found: C, 71.5; H, 5.9. $C_{16}H_{15}NO_3$ requires: C, 71.4; H, 5.6%.

A solution of 8.7 parts of 7-benzoyloxy-3,4-dihydro-3-methyl-2H-1,4-benzoxazine in 15 parts of boron trifluoride-acetic acid complex was heated during 4 hours on a water-bath. The resulting mixture was stirred into 50 parts of warm water, filtered, cooled and made alkaline by the addition of potassium carbonate. The precipitate obtained was collected, extracted with ether, and the dried ethereal solution was distilled to remove the solvent. The brown residue was crystallised from methanol to give 2.8 parts of 6-acetyl-3,4-dihydro-7-hydroxy-3-methyl-2H-1,4-benzoxazine as green prisms, melting point 111–113° C. Recrystallisation from methanol afforded yellow-green prisms, melting point 114° C.

*Analysis.*—Found: C, 63.7; H, 6.3; N, 6.7. $C_{11}H_{13}NO_3$ requires: C, 63.8; H, 6.3; N, 6.8%.

A mixture of 0.5 part of 6-acetyl-3,4-dihydro-7-hydroxy-3-methyl-2H-1,4-benzoxazine, 5 parts of diethyl oxalate, and sodium ethoxide (prepared by dissolving 0.25 part of sodium in the minimum amount of ethanol), was heated during 60 minutes on a water-bath. Ether was added and the solid obtained on filtration was washed with ether and stirred into 10% hydrochloric acid. The mixture was extracted with ether, the dried ethereal extract was evaporated, and the residue heated under reflux with 5 parts of saturated ethanolic hydrogen chloride for 1 hour. On evaporation of the solution and trituration of the residue with aqueous sodium carbonate, a yellow solid was obtained. Crystallisation from ethanol afforded 0.4 part of ethyl 3,4-dihydro-3-methyl-6-oxy-2H,6H-chromeno(7,6-b)-1,4-oxazine - 8 - carboxylate as brown blades, melting point 188–190° C. which crystallised from ethanol as golden-brown blades, melting point 191–192° C.

*Analysis.*—Found: C, 62.2; H, 5.3; N, 4.8. $C_{15}H_{15}NO_5$ requires: C, 62.3; H, 5.2; N, 4.8%.

0.3 part of ethyl 3,4-dihydro-3-methyl-6-oxo-2H,6H-chromeno(7,6-b)-1,4-oxazine-8-carboxylate were heated under reflux during two hours with 2 parts of glacial acetic acid and 2 parts of 4 N-sulphuric acid. On cooling, 0.24 part of 3,4-dihydro-3-methyl-6-oxo-2H,6H-chromeno(7,6-b)-1,4-oxazine-8-carboxylic acid monohydrate crystallised as brown rhombs, melting point 285–287° C. (with decomposition). The monohydrate was recrystallised from aqueous dioxan to yield orange plates, melting point 286–287° C. (with decomposition).

*Analysis.*—Found: C, 56.2; H, 4.4. $C_{13}H_{11}NO_5.H_2O$ requires: C, 55.9; H, 4.8%.

Drying for four hours at 135° C. and 5 millimetres pressure converted the monohydrate into the anhydrous acid, melting point 290–292° C. (with decomposition).

*Analysis.*—Found: C, 59.5; H, 4.6. $C_{13}H_{11}NO_5$ requires: C, 59.8; H, 4.2%.

*Example 3*

The clinical evaluation of the compounds was based on the antigen inhalation provocation test on human volunteers who suffer from specific allergic asthma. The degree of asthma provoked by the inhalation of an antigen to which the volunteers are sensitive can be measured by repeated estimation of the reduction of air-way resistance.

A suitably designed spirometer was used to measure the forced expiratory volume at one second ($F.E.V._{1.0}$), hence the changes in the air-way resistance. The antiallergic activity of a compound is estimated from the difference between the maximum per cent $F.E.V._{1.0}$ reduction following control and test provocations after drug administration conducted under identical experimental conditions. Thus:

Percent protection=100×

$$\left[\frac{\text{Av. max. percent } F.E.V._{1.0}}{\text{Av. max. percent } F.E.V._{1.0}} \text{fall control shock} - \frac{\text{Max. percent } F.E.V._{1.0}}{\text{fall control shock}} \text{fall test shock}\right]$$

For example, when a 0.5% aerosol solution (estimated dose inhaled is 0.1 milligram) of the sodium salt of 3,4-dihydro-3,6-dioxo-2H,6H - chromeno-(7,6-b)-1,4-oxazine-8-carboxylic acid is inhaled, it affords 65% protection when administered 10 minutes before the antigen. Similarly, the sodium salt of 3,4-dihydro-3-methyl-6-oxo-2H, 6H-chromeno-(7,6-b)-1,4-oxazine-8-carboxylic acid gives 65–70% protection. Under these conditions, antihistamines do not give more than about 10% protection.

We claim:

1. A compound selected from the group consisting of chromone derivatives of the formula:

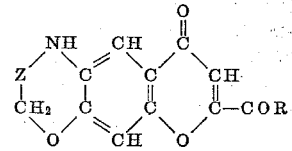

and alkali metal salts, ammonium salts and lower alkyl esters thereof, wherein R is a member selected from the group consisting of hydroxy, —NH-lower alkylene-COOH, —O-lower alkylene-$NH_2$, —O-lower alkylene-lower alkylamino, —O-lower alkylene-di (lower) alkylamino and —O-lower alkylenepiperidino, and Z is a member selected from the group consisting of methylene, lower alkyl-substituted methylene and carbonyl.

2. 3,4-dihydro-3,6-dioxo - 2H,6H - chromeno(7,6-b)-1,4-oxazine-8-carboxylic acid.

3. Alkali metal salt of 3,4-dihydro-3,6-dioxo-2H,6H-chromeno(7,6-b)-1,4-oxazine-8-carboxylic caid.

4. Ammonium salt of 3,4-dihydro-3,6-dioxo-2H,6H-chromeno(7,6-b)-1,4-oxazine-8-carboxylic acid.

5. 3,4-dihydro-3-methyl-6-oxo - 2H,6H - chromeno(7,6-b)-1,4-oxazine-8-carboxylic acid.

6. Alkali metal salt of 3,4-dihydro-3-methyl-6-oxo-2H,6H-chromeno(7,6-b)-1,4-oxazine-8-carboxylic acid.

7. Ammonium salt of 3,4-dihydro-3-methyl-6-oxo-2H,6H-chromeno(7,6-b)-1,4-oxazine-8-carboxylic acid.

8. A process for the preparation of a chromone derivative of the formula:

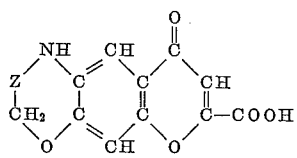

wherein Z is a member selected from the group consisting of methylene, lower alkyl-substituted methylene and carbonyl, which comprises the steps of condensing the corresponding compound of the formula:

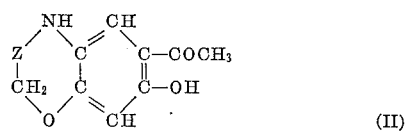

(II)

wherein Z has the precedingly-recited significances, with diethyl oxalate and thereafter cyclising the resultant diketone by heating with a mixture of glacial acetic acid and concentrated hydrochloric acid.

9. A process according to claim 8 wherein, when Z is carbonyl, said compound of Formula II is prepared by reducing 5-nitroresacetophenone to 5-aminoresacetophenone, chloracetylating the amino group and subsequently heating with postassium acetate.

10. A process according to claim 8 wherein, when Z is methylene, said compound of Formula II is prepared by reacting 5-benzoyloxy-2-nitrophenol with chloracetone to yield 5-benzoyloxy-2-nitrophenoxy acetone followed by hydrogenation and acetylation.

References Cited by the Examiner

Kogura, "Nippon Kagaku Zasshi," vol. 80, pp. 1467–1472 (1959).

WALTER A. MODANCE, *Primary Examiner.*

R. T. BOND, *Assistant Examiner.*